United States Patent
Gariel et al.

(10) Patent No.: US 12,518,239 B2
(45) Date of Patent: Jan. 6, 2026

(54) OPTIMIZING AIRCRAFT LOAD DISTRIBUTION

(71) Applicant: Joby Aero, Inc., Santa Cruz, CA (US)

(72) Inventors: Maxime Gariel, San Francisco, CA (US); Steven Hiles, Melbourne, FL (US); Evan Wilson, San Francisco, CA (US)

(73) Assignee: JOBY AERO, INC., Santa Cruz, CA (US)

( * ) Notice: Subject to any disclaimer, the term of this patent is extended or adjusted under 35 U.S.C. 154(b) by 744 days.

(21) Appl. No.: 17/684,500

(22) Filed: Mar. 2, 2022

(65) Prior Publication Data

US 2022/0284531 A1    Sep. 8, 2022

Related U.S. Application Data

(60) Provisional application No. 63/156,984, filed on Mar. 5, 2021.

(51) Int. Cl.
*G06Q 10/08* (2024.01)
*G01M 1/12* (2006.01)
(Continued)

(52) U.S. Cl.
CPC ............ *G06Q 10/08* (2013.01); *G01M 1/125* (2013.01); *G06Q 10/06316* (2013.01); *G06Q 10/0633* (2013.01)

(58) Field of Classification Search
CPC ............ G06Q 10/06316; G06Q 10/08; G06Q 10/0633; G01M 1/125
(Continued)

(56) References Cited

U.S. PATENT DOCUMENTS

| 2,890,826 A | * | 6/1959 | Cushman | G01M 1/125 |
| | | | | 73/65.05 |
| 2,987,254 A | * | 6/1961 | Kolisch | G06G 7/70 |
| | | | | 73/65.06 |

(Continued)

FOREIGN PATENT DOCUMENTS

| CN | 114372639 A | * | 4/2022 | G06Q 10/04 |
| EP | 1211172 A2 | * | 6/2002 | B64C 29/00 |

(Continued)

OTHER PUBLICATIONS

JPH05185995 Jul. 27, 1993 (Year: 1993).*

(Continued)

*Primary Examiner* — Peter J Macchiarolo
*Assistant Examiner* — Monica S Young
(74) *Attorney, Agent, or Firm* — Dority & Manning, P.A.

(57) ABSTRACT

A method includes determining initial load distribution data for a cargo area in an aircraft based on an estimated total weight of unloaded items. The cargo area includes a plurality of zones. The initial load distribution data includes a recommended weight for each of the zones and an estimated center of gravity (CG) for the aircraft as loaded with the items. The method includes displaying the initial load distribution data, acquiring a first weight value for a first set of items, and determining that the first set of items has been loaded into a first zone. The method includes determining updated load distribution data based on the first weight value and the location of the first zone in the aircraft. The updated load distribution data includes an updated recommended weight for each of the zones and an updated CG. The method includes displaying the updated load distribution data.

34 Claims, 11 Drawing Sheets

(51) Int. Cl.
*G06Q 10/0631* (2023.01)
*G06Q 10/0633* (2023.01)

(58) Field of Classification Search
USPC .......................................................... 73/802
See application file for complete search history.

(56) References Cited

U.S. PATENT DOCUMENTS

| | | | | |
|---|---|---|---|---|
| 4,622,639 | A * | 11/1986 | Adelson | G01M 1/127 |
| | | | | 73/65.06 |
| 5,823,468 | A * | 10/1998 | Bothe | B64B 1/34 |
| | | | | 244/209 |
| 9,508,234 | B2 * | 11/2016 | Noe | B64D 9/003 |
| 2017/0315014 | A1 * | 11/2017 | Regan | B64D 11/06 |
| 2021/0293650 | A1 * | 9/2021 | Bes Torres | G01M 1/125 |

FOREIGN PATENT DOCUMENTS

| | | | | |
|---|---|---|---|---|
| JP | S61238595 | * | 10/1986 | |
| JP | H05185995 | * | 7/1993 | |
| WO | WO-2008008051 A2 | * | 1/2008 | ........... G05D 1/0858 |
| WO | WO-2008062867 A1 | * | 5/2008 | ......... G01G 23/3738 |

OTHER PUBLICATIONS

AMC-ACLP-Workbook-36-101-vol. II-Jan. 1, 2015 (Year: 2015).*
ICODES_A_Load-Planning_System_that_Demonstrates_the_Kym Pohl and Peter Morosoff: InterSymp-2011, Baden-Baden, Germany, Aug. 2, 2011 (Year: 2011).*
Icodes-integrated-computerized-deployment-system CDM Technologies Inc., San Luis Obispo, California: Technical Report (CDM-20-06), Nov. 2006 (Year: 2006).*
Translation_CN114372639 (Year: 2022).*
Aircraft Load Optimization—QUBO models under multiple constraints. Article dated Feb. 22, 2021.
Center of gravity of an aircraft—Wikipedia. Downloaded from the wayback machine. Archived on Feb. 24, 2021. Accessed May 2, 2022. https://web.archive.org/web/20210224203941/https://en.wikipedia.org/wiki/Center_of_gravity_of_an_aircraft.
Cessna Grand Caravan Information Manual—Dated Jun. 5, 2008. Extract the following PDF pages for submission: 1-8, 25-26, 52-53, 72-83, 331-382.
Optimal Aircraft Load Balancing. Article dated Nov. 2008.
Optimizing Air Cargo Load Planning and Analysis. Article dated Jan. 2004.

* cited by examiner

| | As Loaded (lbs) | Volume (%) | Optimal (lbs) | Acceptable range (lbs) | Index | % MAC |
|---|---|---|---|---|---|---|
| Cargo | 0 (1500.0) | | 1500.0 | | | |
| Zone 1 | Weight (lbs) | Vol % | 190 | 261 - 190 | | |
| Zone 2 | Weight (lbs) | Vol % | 393 | 541 - 393 | | |
| Zone 3 | Weight (lbs) | Vol % | 226 | 312 - 226 | | |
| Zone 4 | Weight (lbs) | Vol % | 155 | 214 - 155 | | |
| Zone 5 | Weight (lbs) | Vol % | 144 | 0 - 144 | | |
| Zone 6 | Weight (lbs) | Vol % | 112 | 0 - 112 | | |
| Cab. Cargo | 0 | | | | | |
| Pod A | Weight (lbs) | Vol % | 0 | 172 - 0 | | |
| Pod B | Weight (lbs) | Vol % | 0 | 0 - 0 | | |
| Pod C | Weight (lbs) | Vol % | 0 | 0 - 0 | | |
| Pod D | Weight (lbs) | Vol % | 280 | 0 - 280 | | |
| Pilot + fit kit | 250.0 | | | | 972 | |
| Observer | 0.0 | | | | 0 | |
| Total Payload | 250.0 | | | | 972 | |
| Empty Weight | 4839.38 | | | | 438 | |
| Zero Fuel Weight | 5189.38 | | | | 410 | 8.6 |
| Fuel | 1200.0 | | | | 30 | |
| TO Weight | 6389.38 | | | | 440 | 14.3 |
| Taxi Fuel | Weight (lbs) | | | | | |
| Ramp Weight | 6389.38 | | | | | |

FIG. 7

OPTIMIZING AIRCRAFT LOAD DISTRIBUTION

CROSS-REFERENCE TO RELATED APPLICATION

This application claims the benefit of U.S. Provisional Application No. 63/156,984, filed on Mar. 5, 2021. The disclosure of the above application is incorporated herein by reference in its entirety.

FIELD

The present disclosure relates to managing aircraft weight and balance.

BACKGROUND

An aircraft may have associated weight and balance limits for takeoff. For example, a maximum weight limitation may limit the maximum weight of the aircraft to ensure structural integrity and flight safety. As another example, center of gravity (CG) limits may specify the location of the aircraft's center of gravity, which may affect the aircraft's stability and control during flight. Weight and balance values for takeoff may include various components, such as occupants, cargo, fuel, and other items. A pilot, or other user, may calculate weight and balance prior to flight using a variety of different methods.

SUMMARY

In one example, the present disclosure is directed to a non-transitory computer-readable medium comprising computer-executable instructions. The computer-executable instructions are configured to cause one or more processing units to determine initial load distribution data for an aircraft cargo area in an aircraft based on an estimated initial total weight of unloaded items, wherein the aircraft cargo area includes a plurality of zones, and wherein the initial load distribution data includes a recommended weight for each of the zones and an estimated center of gravity (CG) for the aircraft as loaded with the items. The computer-executable instructions are configured to display the initial load distribution data on a user device, acquire a first weight value for a first set of one or more items, and determine that the first set of one or more items has been loaded into a first zone. The computer-executable instructions are configured to determine updated load distribution data based on the first weight value and the location of the first zone in the aircraft, wherein the updated load distribution data includes an updated recommended weight for each of the zones and an updated CG for the aircraft. The computer-executable instructions are configured to display the updated load distribution data on the user device.

In one example, the present disclosure is directed to a method comprising determining initial load distribution data for an aircraft cargo area in an aircraft based on an estimated initial total weight of unloaded items, wherein the aircraft cargo area includes a plurality of zones, and wherein the initial load distribution data includes a recommended weight for each of the zones and an estimated center of gravity (CG) for the aircraft as loaded with the items. The method further comprises displaying the initial load distribution data on a user device, acquiring a first weight value for a first set of one or more items, and determining that the first set of one or more items has been loaded into a first zone. The method further comprises determining updated load distribution data based on the first weight value and the location of the first zone in the aircraft, wherein the updated load distribution data includes an updated recommended weight for each of the zones and an updated CG for the aircraft. The method further comprises displaying the updated load distribution data on the user device.

BRIEF DESCRIPTION OF THE DRAWINGS

The present disclosure will become more fully understood from the detailed description and the accompanying drawings.

FIGS. 7-8 illustrate example weight and balance management GUIs.

In the drawings, reference numbers may be reused to identify similar and/or identical elements.

DETAILED DESCRIPTION

Figure 1A:
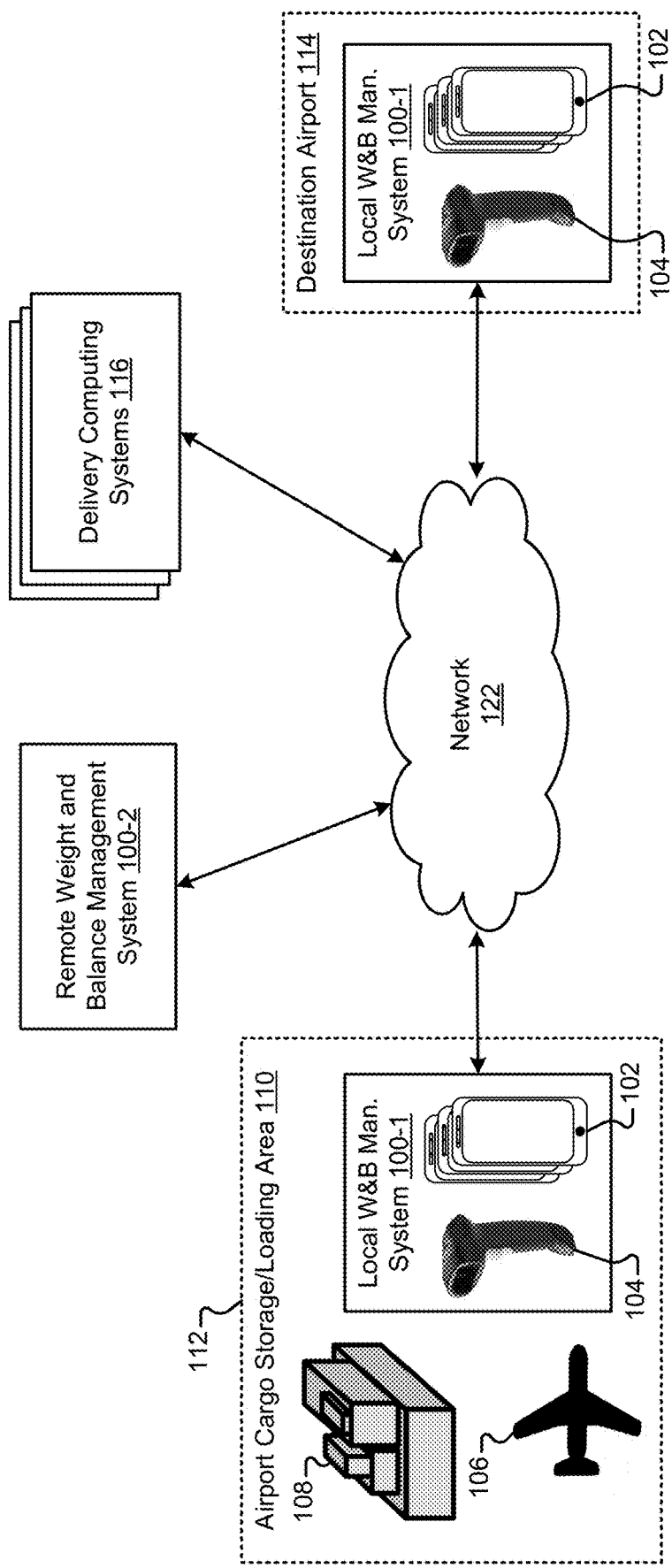
FIGS. 1A-1B illustrate an example environment that includes an example weight and balance management system.
Figure 1B:
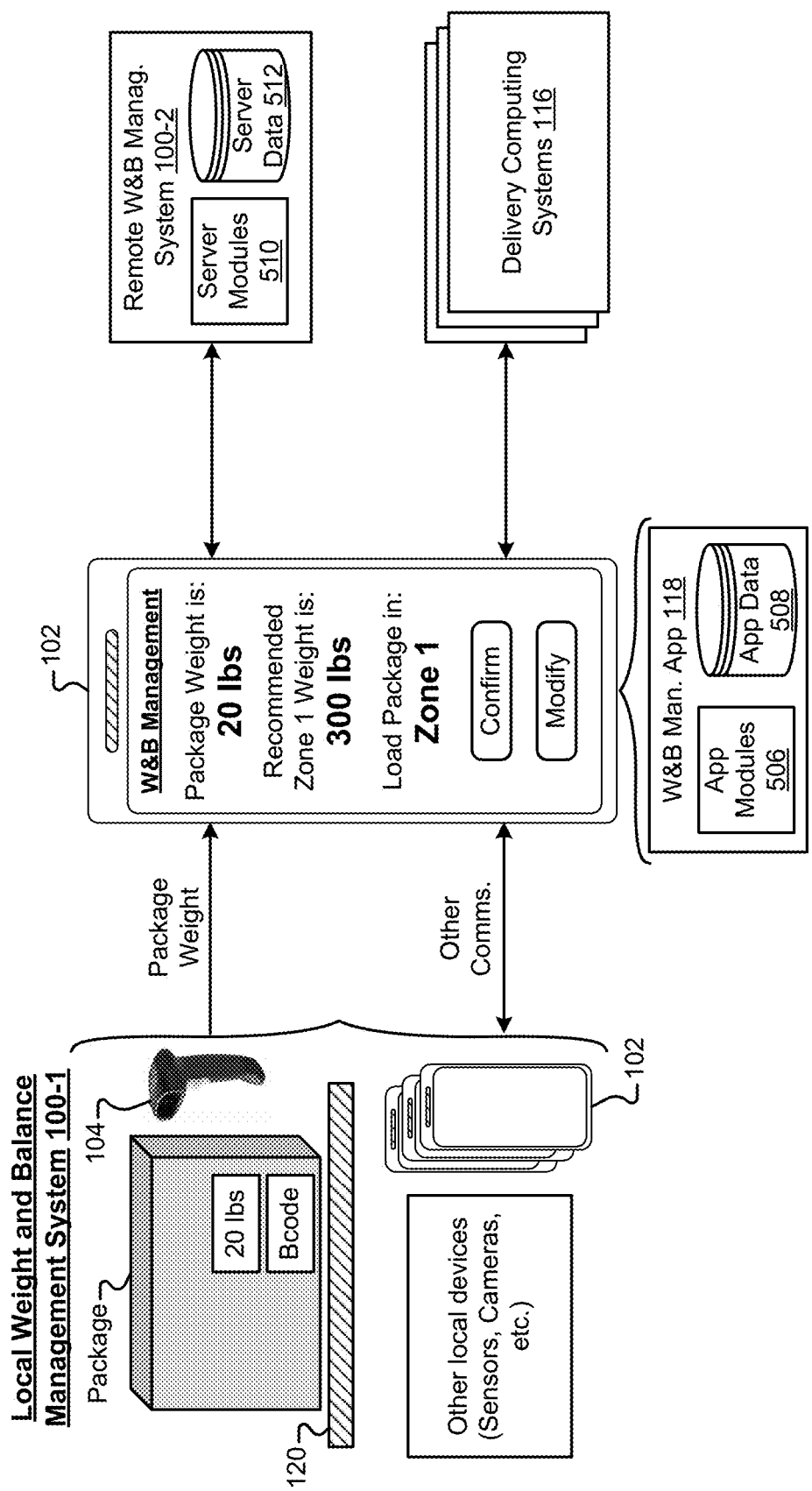

FIGS. 1A-1B illustrate an environment that includes an example weight and balance management system that may manage loading cargo, passengers, and/or other materials (e.g., fuel, deicing fluid, etc.) onto an aircraft, such as a cargo aircraft or passenger aircraft. The weight and balance management system may include a local management system 100-1 (e.g., local computing devices 102 and/or scanning devices 104) and/or a remote management system 100-2 (e.g., a remote server). The techniques of the present disclosure may be implemented to different extents by the local/remote weight and balance management systems 100-1, 100-2, depending on the specific implementation. The functionality associated with the local and/or remote weight and balance managements systems 100-1, 100-2 may be referred to generally herein as a weight and balance management system 100 or a "management system 100."

The environment includes an aircraft 106 (e.g., a cargo aircraft) and cargo 108 to be loaded onto the aircraft 106. Although implementation of the management system 100 with respect to an airplane (e.g., cargo airplane) is illustrated and described herein, other aircraft may be loaded according to the techniques of the present disclosure. For example, other aircraft may include, but are not limited to, helicopters, tilt-rotor aircraft, electric vertical takeoff and landing vehicles (eVTOL), and other aircraft. The management system 100 may also be used to manage weight and balance of any other vehicles that carry passengers, cargo, and/or other materials, such as cargo ships.

The aircraft 106, cargo 108, and local management system 100-1 may be located at an airport cargo storage and loading area 110 in which the aircraft 106 is loaded with cargo 108. The loaded aircraft may travel from the origin airport 112 to a destination airport 114, which may include other computing devices 102 and scanning devices 104 that implement components of the management system 100. For example, components of the management system 100 at the destination airport 114 may have knowledge of the total cargo weight, load distribution, and the package placement in the arriving aircraft.

The management system 100 may be operated by one or more users. Different users may have different roles. In some implementations, users may include a pilot (e.g., a pilot in command) and a copilot. In some implementations, users may include one or more cargo handlers (e.g., package handlers) that load and secure cargo (e.g., packages) onto the aircraft 106. In some implementations, some users may monitor loading of the aircraft 106 using the management system 100. For example, a pilot may monitor and/or supervise loading of the aircraft 106 using the management system 100.

The management system 100 can help one or more users efficiently load an aircraft with a proper weight distribution, such as a proper center of gravity (CG). For example, the management system 100 may determine load distribution data indicating recommended weight distributions in the aircraft. Additionally, the management system 100 may also generate graphical user interfaces (GUIs) that provide the load distribution data to the user, along with recommended cargo placements while loading. The management system 100 may provide guidance for loading the aircraft 106 that may be updated dynamically based on how the user decides to place packages in the aircraft. For example, the management system 100 may provide real-time feedback on cargo loading, which may include loading suggestions that are modified as the cargo is loaded onto the aircraft. Accordingly, the management system 100 may provide one or more users with a real-time, accurate, and flexible way to manage aircraft loading for proper weight and balance.

FIGS. 1A-1B include delivery computing systems 116 that may include remote computing systems (e.g., servers) of parties that deliver cargo (e.g., packages) to the origin airport 112. Example parties that deliver cargo may include delivery businesses that operate fleets of aircraft, trucks, and/or other vehicles that transport packages to the origin airport 112. The delivery computing systems 116 may also include computing systems of other businesses that may provide packages to the origin airport 112 for delivery by the aircraft 106. In some implementations, the management system 100 (e.g., local/remote computing devices) may communicate with the delivery computing systems 116. For example, the management system 100 may acquire package data (e.g., package weights, dimensions, and other package data) from the delivery computing systems 116.

The unloaded cargo 108 (e.g., packages) for loading onto the aircraft 106 may be brought to the airport loading area 110 (e.g., via delivery vehicles). An aircraft may transport a variety of types of cargo. The cargo items or other items loaded onto the aircraft may be referred to herein generally as "cargo items" or "items." Example items may include packages, although other types of cargo may be transported in the aircraft 106. The cargo 108 may include packages of various weights, shapes, and sizes. Example packages may include, but are not limited to, boxes, tubes, soft packages, crates, wrapped items, bags (e.g., bags of envelopes), and other packages. In some implementations, multiple packages may be included in a single package container. Example package containers may include, but are not limited to, totes, tubs, baskets, carts, boxes, pallets, crates, and unit load devices (ULDs) (e.g., aircraft cargo containers). In some cases, a package container including packages may be referred to as a single item herein. In some implementations, the package containers may be configured specifically for aircraft transport.

An aircraft may include one or more cargo holding areas (hereinafter "cargo areas"), which may be referred to as "cargo compartments" or "cargo holds." The cargo area sizes may vary. In some cases, such as in a cargo aircraft, the cargo area may include a large portion of the aircraft that is dedicated to carrying cargo. For example, a cargo aircraft may include a rear access door/ramp that accesses a main cargo area, such as a walk-in cargo area or other size of cargo area. In some cases, an aircraft may include one or more smaller areas/compartments that users may access, but generally not enter on foot. For example, an aircraft may include cargo storage bays that are accessed via cargo access doors (e.g., from the side of the aircraft). An aircraft can include one or more cargo areas/compartments and associated cargo access doors. An aircraft may also include one or more passenger areas (e.g., an aircraft cabin) for carrying one or more passengers.

Figure 2:
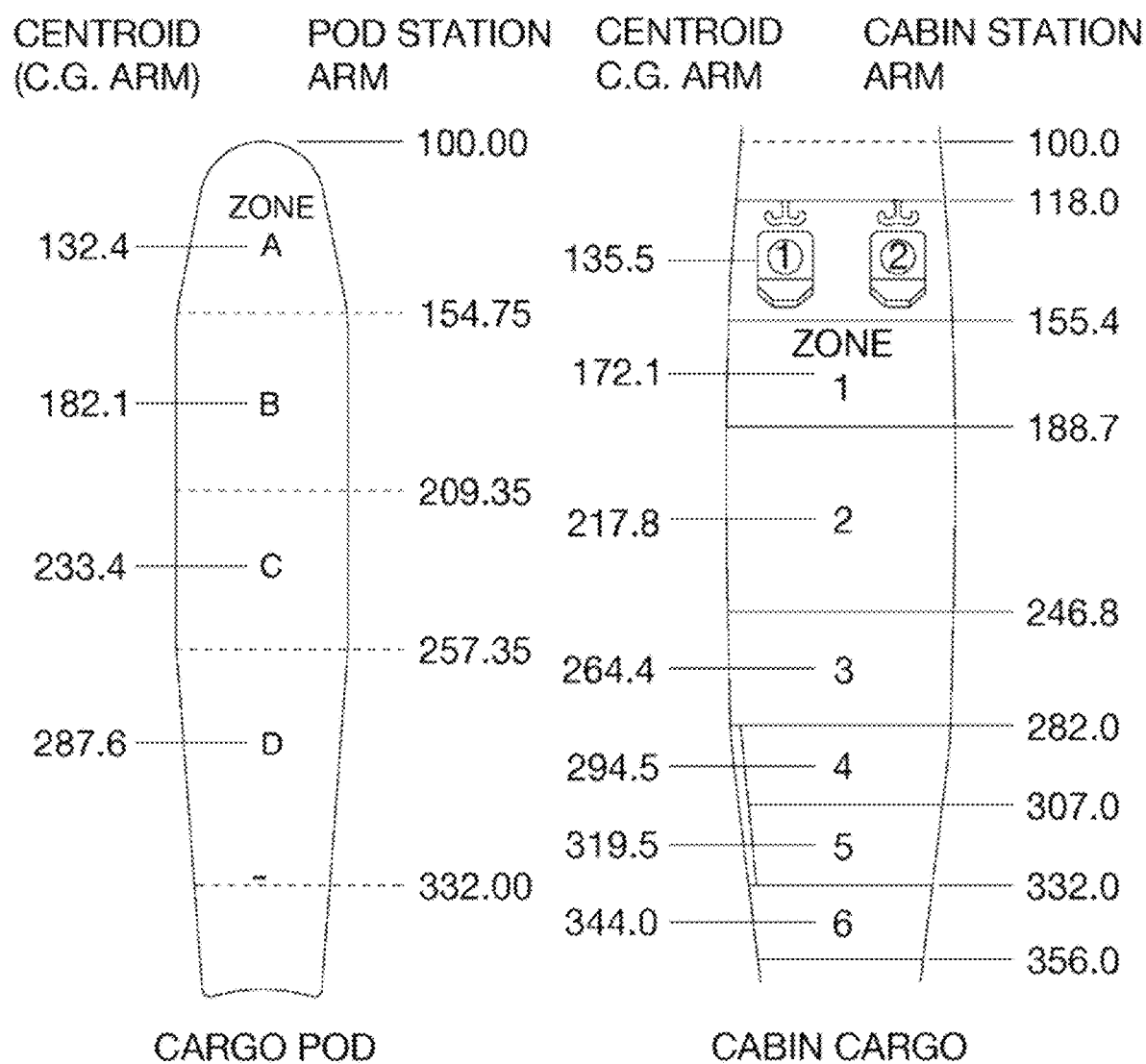
FIG. 2 illustrates example cargo areas of a Cessna Caravan 208B.

FIG. 2 illustrates example cargo areas of a Cessna Caravan 208B. The example cargo areas in FIG. 2 include a main cargo area ("cabin cargo" area) that is accessible via a rear cargo door. The example cargo areas in FIG. 2 also include an underbody cargo area ("cargo pod" area), located under the aircraft, that is accessible via side access doors. The cargo area configuration of the Cessna Caravan 208B is only one example cargo configuration that may be managed by the management system 100 of the present disclosure. As described herein, loading of other cargo area and/or passenger cabin configurations may be managed by the management system 100 of the present disclosure.

An aircraft may have a basic empty weight. The empty weight may refer to the aircraft weight without a pilot, cargo, fuel, de-icing fluid, or other items and materials. The empty aircraft may also have an empty CG. The aircraft CG value may shift when the aircraft is loaded with cargo, fuel, a pilot, de-icing fluid, and other items and materials.

An aircraft that is fully loaded and fueled for takeoff may have a gross weight. A gross weight may refer to the weight of the aircraft and all additional weights for takeoff. For example, a gross weight may refer to the sum of the empty aircraft weight, the takeoff fuel weight, the pilot weight, the cargo weight, the de-icing fluid weight, and additional item weights (e.g., a pilot kit). If a co-pilot and/or passengers are aboard, their weights and personal item weights (e.g., gear/baggage) are added into the gross weight. The aircraft gross weight at takeoff may also be referred to as a "takeoff weight." The fully loaded aircraft at gross weight may have a CG at the time of flight that is referred to as a "takeoff CG." In some cases, the management system 100 may also use a gross weight value (e.g., a "ramp weight" value or "taxi weight" value) that includes additional fuel weight that is consumed during taxiing prior to takeoff.

In some implementations, the management system 100 may implement maximum weight values that indicate maximum weights allowed for the aircraft 106. For example, the aircraft 106 may have an associated maximum takeoff weight (MTW), which may also be referred to as a maximum gross takeoff weight (MGTOW) or maximum takeoff mass (MTOM). In some implementations, an aircraft may have a maximum ramp weight (MRW), which may also be referred to as a maximum taxi weight (MTW). The maximum ramp weight may indicate the maximum gross weight of the aircraft including the taxi and run-up fuel. The maximum ramp/taxi weight may be greater than the maximum takeoff weight, as fuel will be burned during taxi and run-up operations.

During flight, the gross weight of the aircraft may decrease due to the loss of consumed fuel. As such, the aircraft CG may change during flight. The gross weight at the time of landing may be referred to as a "landing weight." The CG at the time of landing may be referred to as a "landing CG."

Figure 3:
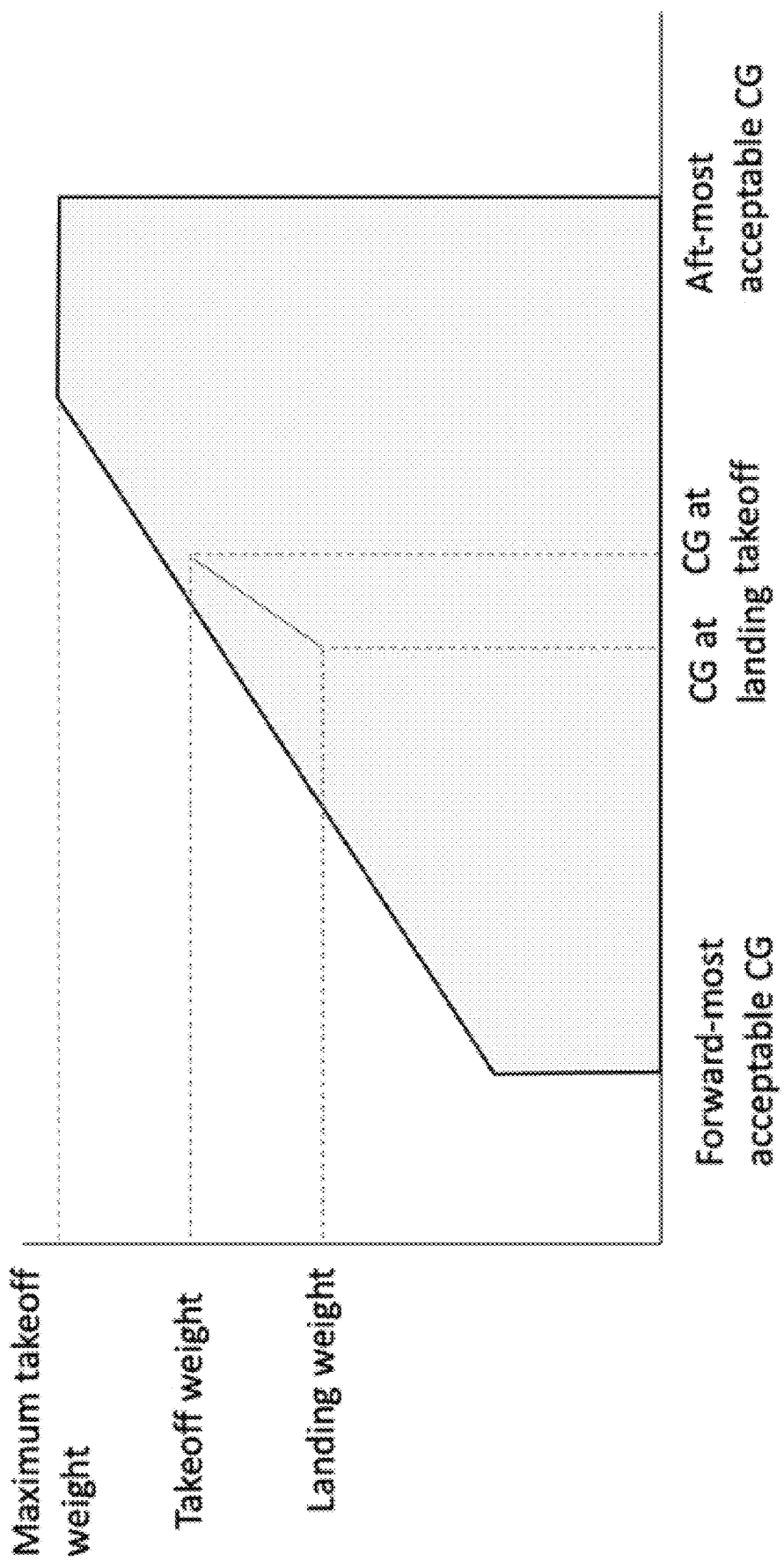
FIG. 3 illustrates an example center of gravity envelope.
Figure 8:
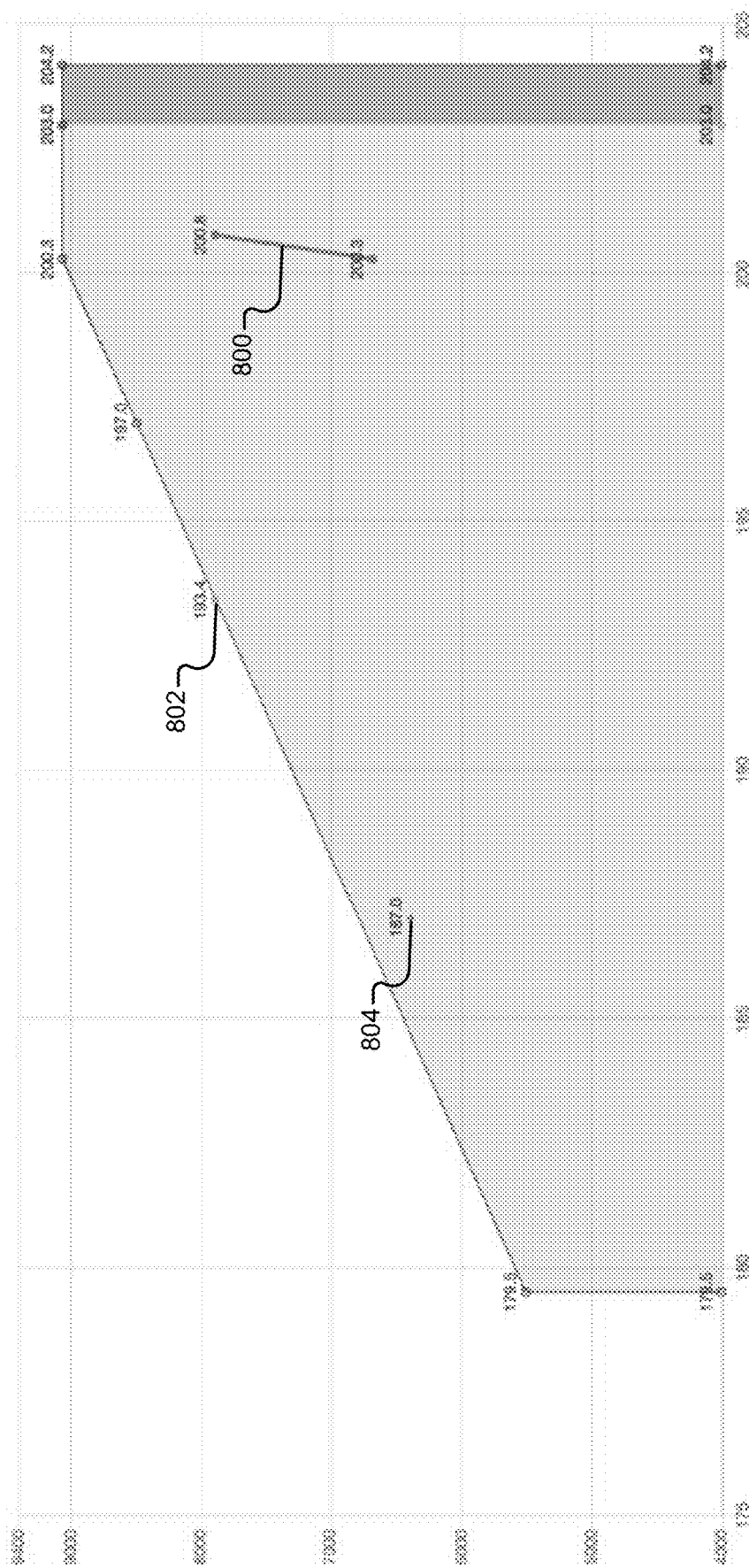

An aircraft may have a maximum gross weight limit for takeoff ("maximum takeoff weight") and a range of allowable CG locations for flight. FIG. 3 illustrates an example CG envelope, which may be provided by the aircraft manufacturer. The vertical axis indicates acceptable aircraft takeoff weight. The horizontal axis indicates the acceptable CG location. An aircraft should be loaded to stay within the shaded area weight and CG limits. Example acceptable takeoff/landing weights and CGs are illustrated in FIG. 3 and FIG. 8. The management system 100 may calculate the CG and gross weight values illustrated in FIG. 3 and FIG. 8.

The management system 100 (e.g., a "weight and balance management application 118") may determine the CG by dividing the aircraft into cargo zones and aggregating item weights (e.g., package weights) into the cargo zones. For example, each cargo area/compartment of an aircraft may include one or more cargo zones ("zones"). Each zone defines a space for cargo, such as a floorspace for holding cargo. Larger cargo areas may include a plurality of zones over which a user may traverse while loading cargo. Smaller cargo areas may include fewer zones, or only a single zone. The aircraft manufacturer may define the zones. In FIG. 2, the cabin cargo area and the cargo pod area of the Cessna Caravan 208B include zones 1-6 and zones A-D, respectively.

In some implementations, zones may be defined by markings in the cargo area. For example, zones may be marked off using ink/paint, tape, stickers, stampings, placards, and/or other markings. The zone markings may indicate a distance, or range of distances, from a fixed point in the aircraft. In some implementations, the zone markings (e.g., placards) may include a maximum weight value and/or maximum weight per unit area value for the zone. In some aircraft, zones may be separated by dividers (e.g., netting). Some aircraft may include tie downs for securing cargo in the zones. In some implementations, the zones may be marked by the aircraft manufacturers. Although the manufacturers may mark the zones, in other implementations, other parties (e.g., a pilot or other user) may modify the zones and arms, such as by reshaping the zones with additional/alternative markings. In these implementations, the new/alternative zones may be associated with new/alternative weights and/or arms. In some implementations, the management system 100 may provide a user interface (e.g., in the weight and balance management application 118) for entering the new/alternative weights and/or arms.

The boundaries for each zone may be defined as a distance from a defined point on the aircraft (e.g., a common point or reference datum). In FIG. 2, the common point is a point in front of the cockpit that is also located at the front of the cargo pod. The common point is labeled as 100.00. The measurements in FIG. 2 may be in inches.

Each zone may be associated with a zone arm ("arm"). An arm may refer to a location within the zone (e.g., between the boundaries that define the zone). For example, the arm location may be the centroid of the zone, a center of the zone, or other location within the zone. The arm for each zone may be defined as a distance from a defined point on the aircraft. The zone boundary and arm distances may be defined from the same common point. FIG. 2 illustrates example arms for a Cessna Caravan 208B.

Each zone may be associated with a zone weight value (i.e., a "zone weight") that indicates the total weight of cargo (e.g., packages) in the zone. The management system 100 may calculate load distribution (e.g., CG) by attributing the zone weights to their associated arms. The management system 100 may update load distributions (e.g., CG) for each piece of cargo (e.g., each package) by adding the cargo weight value (e.g., package weight) to the zone weight associated with the zone including the package.

Items (e.g., cargo), passengers, and other materials (e.g., fuel, de-icing fluid, etc.) carried by the aircraft 106 may have associated weight values, which may be used to calculate load distribution and other weight-related values described herein. With respect to cargo (e.g., packages) loaded onto an aircraft, a single weight value may refer to a variety of different arrangements of items. In some cases, a single weight value may be associated with a single package loaded onto the aircraft. In other cases, a single weight value may be associated with a plurality of packages loaded onto the aircraft, such as a plurality of packages that are weighed as a group (or in sequence) and then placed together onto the aircraft. In other cases, a single weight value may be associated with a plurality of packages included in a package container. In cases where packages are included in a package container, the weight value may include the weight of the packages and the container. The management system 100 may be configured to receive any of the variety of weight values described herein.

The management system 100 may calculate load distribution data (e.g., CG) using zone weights and arms as follows. Each piece of payload (e.g., package, pilot, passenger, fuel, etc.) may have an associated zone weight and arm. For each piece i of the payload, its moment $M_i$ can be computed by multiplying its weight w; by its arm; such that: $M_i=w_i*arm_i$. The total moment is the sum of all the moments ($M_{tot}=\Sigma_i M_i$) and the total weight is the sum of all weights ($W_{tot}=\Sigma_i w_i$). The CG location is $CG=M_{tot}/W_{tot}$. In some implementations, the management system 100 may make load distribution calculations (e.g., CG location) on a per-zone basis. In some implementations described herein, the management system 100 may calculate arms for individual pieces of cargo (e.g., individual packages or groups of packages). In these implementations, the management system 100 may make load distribution calculations using the arms for the individual pieces of cargo.

Prior to loading the aircraft, the management system 100 may generate initial load distribution data that indicates recommended zone weights for each zone. For example, the management system 100 may generate a recommended zone weight for each zone and/or minimum and maximum zone weights for each zone. While loading, the management system 100 may update the load distribution data based on the actual weight of cargo (e.g., packages) added to the zones. For example, the management system 100 may update the recommended zone weights (e.g., minimum/maximum weights) for each zone as packages are added. The management system 100 may also indicate to the user (e.g., in a management GUI notification) whether the CG location of the aircraft 106 may be properly maintained based on the current loading and the remaining unloaded cargo. In cases where a desired CG location cannot be achieved, the management system 100 may provide a recommended distribution (e.g., in a GUI) that meets any constraints and brings the CG as close as possible to the desired CG location.

In some aircraft, zones may have a required loading sequence, such that a series of zones should be loaded in a specific order. This may occur if the aircraft has space or access limitations when some zones are loaded. In some aircraft, zones may be loaded in any sequence. For example, some aircraft may have zones that are accessible on foot or via a door when the cargo area is partially loaded. In a specific example, the cargo pod of the Cessna Caravan 208B in FIG. 2 is accessible via side doors.

The management system 100 may be configured to calculate and update load distribution data for aircraft that require, or do not require, a specific loading sequence. For example, the management system 100 (e.g., the weight and balance management application 118) may use zone loading sequence data that indicates a required/preferred zone loading sequence for an aircraft. In these cases, a weight and balance management GUI ("management GUI") may prompt the user to load according to the sequence. For example, the management GUI may recommend loading a whole zone before moving on to another zone. In cases where the zone loading sequence is not required, the management GUI may recommend a zone for loading, which may be changed by the user in the management GUI.

Users may use one or more computing devices when loading the aircraft 106. Example computing devices may include mobile user devices 102, such as smartphones, tablet computers, laptop computers, and wearable devices (e.g., wrist, arm, and/or head-mounted devices). Devices may also include cameras, wired/wireless scales 120 (e.g., smart scales), and wired/wireless scanners 104 that scan packages, such as handheld/fixed barcode scanners and/or handheld/fixed RFID scanners. The various devices may be mobile handheld devices, or may be less mobile, such as attached to objects or fixed in place. In some implementations, the devices may be attached (e.g., removably attached) in the plane cargo area.

The one or more computing devices of the management system 100 may execute one or more weight and balance management applications 118 ("management applications 118") that may be used to load the aircraft 106. The management application(s) 118 executed on one or more user devices may perform the functions attributed to the devices herein. For example, the management application(s) 118 may acquire data, perform calculations, and generate output (e.g., GUIs and other output data) described herein. In a specific example, the management application(s) 118 may acquire package weight/size data, perform load distribution calculations (e.g., optimize loading), render GUIs, and receive user input in the GUIs.

In some implementations, the management system 100 may include a single user device (e.g., a smartphone) that executes a management application 118 that implements the techniques described herein. For example, one or more users may use the management application 118 on a single user device while loading the aircraft 106. In some implementations, multiple devices may implement one or more aspects of the management application 118 described herein. For example, one or more users may use a single user device (e.g., smartphone) and one or more other devices, such as a scale and/or barcode scanner that acquires and transmits package data to the user device. In some implementations, the management system 100 may include multiple user devices (e.g., multiple smartphones, tablets, and/or laptops) that implement the techniques described herein. For example, different users may use different user devices (e.g., smartphones) and other devices (e.g., scales/scanners). In this example, different user devices may generate the same GUIs, or different GUIs (e.g., role-specific GUIs), and also communicate with other devices, such as scales/scanners.

In some implementations, the management system 100 may include a remote management system 100-2 (e.g., a remote server) that may implement the techniques described herein. In these implementations, one or more user devices 102 may communicate with the remote management system 100-2, which may perform some of the functions described herein. For example, the remote management system 100-2 may acquire package data from user devices 102 and/or delivery computing systems 116, perform load distribution calculations, provide data to the user devices 102, and generate GUIs (e.g., web-based GUIs).

The extent to which local user devices and the remote management system implement the techniques of the present disclosure may vary, depending on the specific implementation. In one implementation, the techniques of the present disclosure may be implemented locally on one or more local user devices. In another implementation, the remote management system may perform most of the data acquisition and processing described herein. In this implementation, the local user devices may be used to display data that was acquired and/or processed by the remote management system. As such, specific data acquisition and processing attributed to the local user devices and remote management system described herein are only example data acquisition and processing schemes.

In some implementations, the computing devices may communicate with one another locally (e.g., via Bluetooth or WiFi). The computing devices may communicate with the delivery computing systems 116 and/or the remote management system 100-2 via a network 122. The network 122 may include various types of computer networks, such as a local area network (LAN), wide area network (WAN), and/or the Internet.

Figure 4:
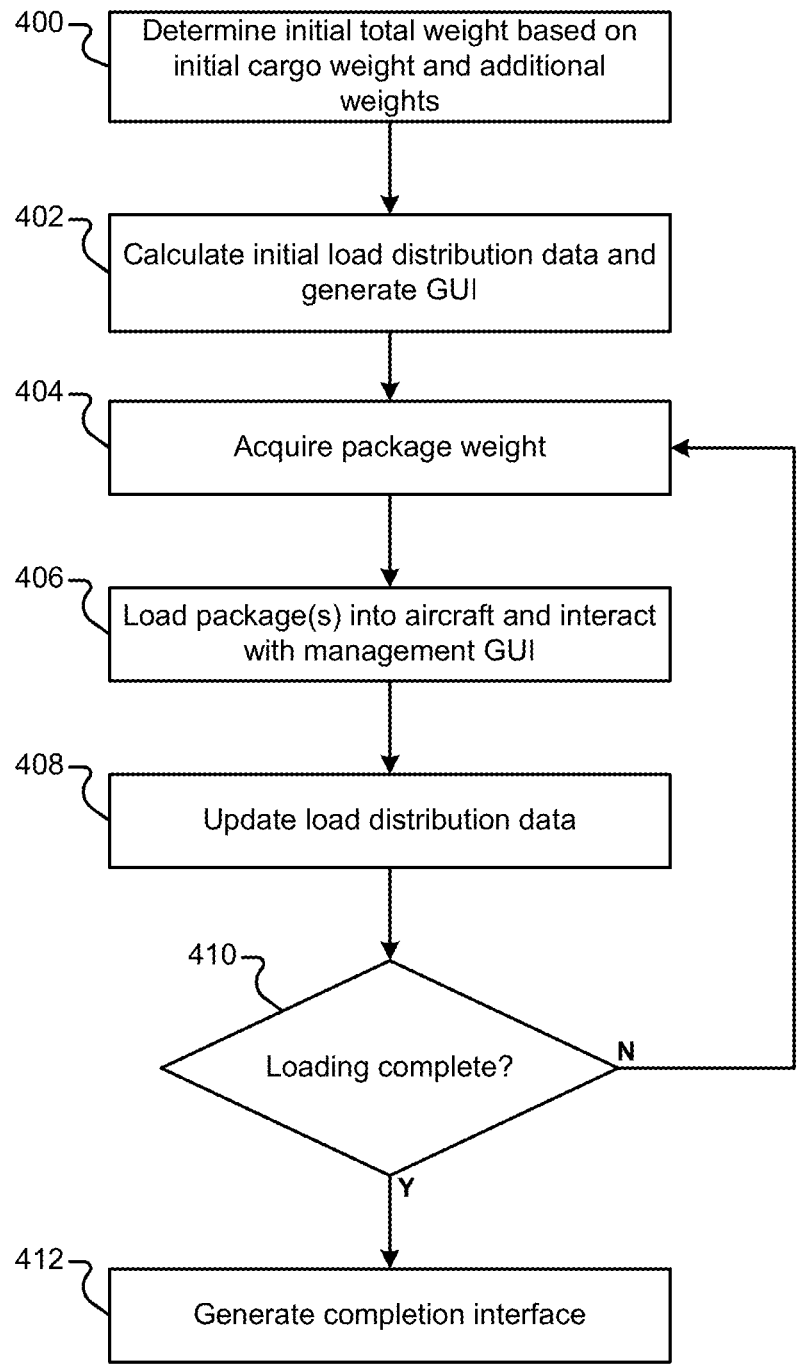
FIG. 4 illustrates an example method that describes using the weight and balance management system while loading an aircraft.

FIG. 4 illustrates an example method that describes using the management system 100 while loading an aircraft. In FIG. 4, it may be assumed that a single user device 102 (e.g., a smartphone or tablet) executing a management application 118 is being used while loading the aircraft. Accordingly, the user device may acquire data, perform load distribution calculations, and generate GUIs for one or more users. Although a single user device may be used in the method of FIG. 4, in some implementations, the single user device may communicate with other devices, such as one or more package scanners 104 (e.g., barcode readers or RFID readers), one or more scales 120, one or more remote delivery systems 116, and/or a remote management system 100-2.

In the method of FIG. 4, the cargo loading area 110 may include unloaded cargo 108 to be loaded on the aircraft 106. For example, the cargo loading area 110 may have a plurality of packages to be loaded on the aircraft 106. In block 400, the user device 102 (e.g., mobile device) may determine an initial total weight (payload) for the aircraft when loaded with cargo and additional weight. An initial total weight may include an initial cargo weight (e.g., estimated or actual), pilot weight, pilot equipment weight (e.g., pilot kit), fuel weight, and other weight.

The user device 102 may determine an initial cargo weight for the cargo 108 to be loaded on the aircraft 106. The cargo weight may include any weight that is loaded into the cargo area. For example, the cargo weight may include the weight of packages along with any other baggage in the area, such as pilot baggage placed in the cargo area. In general, the cargo weight described herein may refer to the sum of the package weights. In some cases, the cargo weight may include package container weights if the packages are included in package containers. The user device may calculate the initial cargo weight as a sum of package weights and any package container weights. The initial cargo weight may be estimated or actual, depending on the accuracy of the package weight data initially acquired by a user device 102.

The user device 102 may acquire the initial cargo weight in a variety of ways. In some implementations, the user may determine the initial cargo weight by weighing the packages (e.g., on a scale). In some implementations, the weights of the packages may be made available to the user device 102 from one or more remote systems, such as one or more of the delivery computing systems 116. In these implementations, the delivery parties that transported the packages may have weighed the packages and made the package weights available to the user device 102, such as via emails, a remote interface, or in another manner.

In some implementations, weights of individual packages may be included on the package. For example, packages may include written weights. As another example, a package may include a scannable code (e.g., a barcode, QR code, or RFID) that indicates the weight. In these examples, the user device 102 may directly read the code using a camera. Additionally, or alternatively, a scanning device (e.g., barcode scanner or RFID scanner) may read the scannable code and indicate the package weight to the user device 102. In some cases, some packages may not have corresponding weights. In these implementations, a user may estimate the weight by hand and/or weigh the package.

The devices may acquire package data in addition to package weight. For example, the devices may acquire package dimensions/volumes, relevant hazardous material information, perishable indications, and/or temperature restrictions (e.g., maximum/minimum temperature thresholds). The additional package data may be acquired from a user reading written data on the package and entering the data into the management system 100 (e.g., using a management GUI). The additional package data may also be acquired by scanning codes on the package (e.g., using a camera, barcode scanner, etc.) that indicate the additional data. For example, the additional package data may include numbers, characters, and/or symbols that may be acquired via optical character recognition and/or other image processing techniques. As another example, the additional package data may be encoded in barcodes, QR codes, or other formats. In some cases, the additional package data may be acquired from the delivery computing systems 116 if the delivery parties that transported the packages acquired the additional package data (e.g., package dimensions). In some implementations, the user may determine the dimensions of the packages at the airport. For example, the user may use a measurement device, a 3D scanner, light detection and ranging (LIDAR) devices, and/or a calibrated camera to determine the package dimensions. In some implementations, the devices used to determine dimensions of the packages may be located near the aircraft 106 as the packages are loaded. In these cases, the user may place the package in front of the measurement device(s) to determine the package dimensions. In some implementations, a management GUI may summarize the package data to the user.

In some implementations, a user device may include a wearable device, such as a wrist mounted device and/or a head-mounted device. If the device is a head-mounted device, such as glasses equipped with scanners and/or sensors, the user may acquire package data by looking at the package. For example, the head-mounted device may determine the dimensions of the package, scan a readable code (e.g., barcode or QR code) on the package, and retrieve additional package data from remote computing systems 100-2, 116.

In addition to the cargo weight, the user device may determine additional weights that factor into the initial total weight. For example, the user device may provide a GUI that receives the additional weights as user input. Additional weights may include, but are not limited, a pilot weight, a pilot equipment weight (e.g., flight kit), additional passenger/equipment weights, and a starting fuel weight (e.g., before engine start). In some implementations, a user may enter the starting fuel weight. In some implementations, the user may enter a starting fuel volume (e.g., in gallons or liters). In these implementations, the management application 118 may determine the starting fuel weight based on the weight of the fuel per unit volume. In some implementations, the user may enter a fuel gauge reading (e.g., a fractional gauge reading). In these implementations, the management application 118 may determine the starting fuel weight based on aircraft-specific data that indicates a fuel volume associated with the gauge reading.

Determining the initial total weight may allow the user device 102 to determine how to distribute the cargo weight across the available zones. In block 402, the user device 102 determines initial load distribution data (hereinafter "initial distribution data"). The initial distribution data may include recommended zone weights for each zone. The recommended zone weights may include ranges of recommended zone weights in some cases, such as upper and/or lower ranges of weights. For example, the zone weights may indicate a minimum/maximum weight that may maintain the CG within range. As another example, the zone weights may include minimum/maximum weights that may allow the CG to remain at the desired location. The zone weights and ranges may be updated as the aircraft is being loaded. The user device 102 may generate a management GUI indicating the initial distribution data (e.g., see FIGS. 7-8). The user may refer to the management GUI before/while loading the aircraft 106.

The user device 102 may determine the initial distribution data based on the components of the initial total weight and the arms associated with the components of the initial total weight. For example, the user device may determine recommended zone weights based on the total cargo weight and its distribution throughout the different zones. Additionally, the user device may assign the pilot weight, copilot weight, the pilot equipment weight, and the copilot equipment weight to an arm located in the cockpit. Additional weights and arms may include passenger weights/arms, a fuel weight/arm, and a de-icing fluid weight/arm.

The management system 100 may use data described herein to generate constraints and objectives that are the inputs into optimization problems. The management system may solve the optimization problems (e.g., objective function) to determine the load distribution data subject to a set of constraints. The load distribution data may include recommended zone weights and a CG value.

The optimization problems may be formulated in a variety of manners. For example, the problems may be formulated as at least one of a linear problem (LP), an integer problem (IP), a mixed-integer linear problem (MIP), and a quadratic problem. The management system 100 may implement one or more algorithms that may include, but are not limited to, Branch-and-Bound, Branch-and-cut, a simplex algorithm, a dual simplex method, an upper bound technique, dynamic programming, quadratic programming, and non-convex programming.

The management system 100 may use a variety of objectives, equations, constraints, and heuristics/rules to determine the load distribution data. Example objectives may include target CG values/ranges for the aircraft. Example equations associated with CG determination may include, but are not limited to: 1) moments for each arm $M_i = w_i * arm_i$, 2) a sum of all moments $M_{tot} = \Sigma_i M_i$, 3) the total weight $W_{tot} = \Sigma_i w_i$, and 4) center of gravity $CG = M_{tot}/W_{tot}$.

Example constraints may include CG constraints, aircraft weight constraints (e.g., with/without fuel), zone constraints, and loading sequence constraints. CG constraints may specify that the CG should remain between a defined forward-most position and an aft-most position. Aircraft weight constraints may specify a maximum weight for the aircraft. Zone constraints may specify a maximum weight for a zone and a maximum volume for a zone. Loading sequence constraints may indicate which zones can be loaded and/or a specific order of zone loading.

In some implementations, zone constraints may include minimum volume constraints for the zones, such as a minimum volume value that indicates a minimum volume of cargo that should be included in a zone. For example, the minimum volume value may indicate an absolute volume for a zone and/or a percentage volume for a zone (e.g., a minimum 75% volume should be filled). In some cases, minimum volume values may vary for different zones. In one example, zones forward of a last loaded zone may require a minimum volume of cargo to prevent shifting during flight.

In some implementations, zone constraints may include minimum weight constraints for the zones, such as a minimum weight value that indicates a minimum weight of cargo that should be included in a zone. In some implementations, the management system 100 may determine minimum weight constraints for the zones based on weights that may be required in order to achieve a feasible solution, such as a feasible CG location and/or maximum weight for remaining zones.

Initially, there may be a large number of possible combinations of weight distribution that may place the CG at a desired location. Loading heuristics/rules may be used to guide the optimization towards a preferred solution. One example heuristic/rule may be to load as much as possible forward of the cabin. For example, the rule may be to load as much weight and/or volume forward of the cabin. Another example heuristic/rule may require at least a certain percentage of maximum allowable weight in zone i before loading zone i+1.

In some implementations, the management system 100 may attempt to generate initial load distribution data and update the load distribution data such that the CG of the loaded aircraft is at, or near, a desired CG for the aircraft. In some implementations, the management system 100 may use optimization techniques that attempt to minimize the distance of the actual CG of the loaded aircraft from the desired CG for the aircraft. For example, the load distribution calculations used by the management system 100 may include an objective function for optimizing CG location subject to other constraints. In this example, the management system 100 may attempt to generate a solution for the objective function that minimizes the distance of the actual CG of the loaded aircraft from the desired CG for the aircraft.

After calculation of the initial distribution data, the user device 102 may generate an initial distribution data GUI that indicates the recommended cargo weight for each zone. The user may use the initial distribution data GUI to determine which packages to start loading onto the aircraft 106.

In block 404, a user selects a package for loading and acquires the package weight. Although a single package may be selected in block 404, a user may select multiple packages and add the package weights. In some cases, a user may load the packages into a package container and weigh the package container. In some cases, a user may acquire package weights and the container weight separately. In these cases, the management application 118 may sum the weight of the packages and the container. The user device 102 may acquire the package weight and container weight in a variety of ways described herein. For example, the user device 102 can acquire the package weight by manual entry, scanning the package weight (e.g., optically scanning using a camera, barcode reader, or other reader), weighing the package, and/or via a remote delivery system 116 or management system 100-2. The user device 102 may acquire the container weight in a similar manner, such as by manual user entry (e.g., of a weight indicated on the container), scanning the container (e.g., if weight data is included on the container), weighing the container, and/or via a remote delivery system 116 or management system 100-2, if such container data is available.

In block 406, the user loads the selected package(s) into the aircraft 106 and may interact with the management GUI. The user may interact with the management GUI in a variety of ways while/after loading the selected package into the aircraft 106. In some implementations, the user may reference the management GUI to determine where to load the package. For example, the user may view the management GUI to determine which zone to use for the package. In some implementations, the management GUI may assume that the acquired package weight in block 404 is being loaded into a zone that is recommended in the management GUI. In these implementations, the user device 102 may update the management GUI to indicate that the package weight is loaded into the recommended zone. For example, the user device 102 may subtract the package weight from the recommended zone weight and update the management GUI accordingly.

In some implementations, the management GUI may be configured to receive user input during loading. For example, the management GUI may include a confirmation GUI element (e.g., button) that the user may select (e.g., touch/click) in order to confirm that the package is being loaded into the recommended zone. As another example, the management GUI may include GUI elements that allow the user to select a different zone for the package than an initially recommended zone. For example, the management GUI may include a modification GUI element (e.g., a modify button) that the user may select. Selection of the modification GUI element may provide the user with a new set of GUI elements for selecting new zones for the package.

In some implementations, the management GUI may include a GUI element for indicating that the user is done loading a zone. The user may select the GUI element to close out the zone, which may then cause the management application 118 to perform a re-computation across other zones. In some implementations, the user may reopen a zone that was previously closed.

In some implementations, the management GUI may include GUI elements for moving packages from one zone to another. For example, in the management GUI, the user may indicate that they will be moving a package from a first zone to a second zone. In a specific example, a user may select a package movement GUI element (e.g., a button) and then indicate the zone that includes the package and the zone that will receive the package after movement. In some implementations, the user may scan the package during the movement to indicate the exact package being moved. In this case, the user device 102 may recalculate the load distribution data in response to the package movement. In some implementations, the management GUI may include GUI elements for moving packages in terms of weight from one zone to another. For example, in the management GUI, the user may indicate that they will be moving an amount of weight from a first zone to a second zone (e.g., without specifying the movement of specific packages).

In some implementations, the management GUI may include GUI elements that receive weight limits via user input. In some cases, a user may enter a zero into a zone to indicate that the user does not want anything loaded in the zone. In response to user zone weight input (e.g., zero), the user device 102 may recalculate the load distribution data.

In some implementations, a user may wear a head-mounted device while loading packages onto the aircraft 106. The head-mounted device may include a display that may display package data along with a specific zone into which the package should be loaded. The head-mounted device may also include a camera, scanning device (e.g., a barcode/QR scanner), and/or other image acquisition device that determines when the user has placed the package into a zone. In this case, the management system 100 may automatically determine the weight of a zone by adding the weight of a placed package to the current zone weight.

In some implementations, the aircraft 106 may be instrumented with devices that automatically scan packages loaded onto the aircraft 106. For example, the aircraft 106 may include RFID scanners or image-based scanners (e.g., barcode scanners) that may scan RFID tags or other codes included on packages. In these implementations, the management system 100 may determine weights and locations of packages based on package data that may be acquired via automatic detection of RFID tags or other codes. In a specific example, one or more zones (e.g., each zone) may include an RFID scanner that may detect which packages are included in the zones, along with the weight of the packages included in the zones. In another example, the aircraft may include one or more image acquisition devices (e.g., cameras) or other types of image-based scanning devices (e.g., a barcode scanner) that may detect which packages are included in the zones.

The weights associated with each zone may be tracked by the user device 102 (e.g., a smartphone) over time as the zones are loaded. In some implementations, a scale 120 may keep an accumulated weight for each zone as the aircraft 106 is loaded. In these implementations, the scale 120 may be set back to zero once the recommended zone weight is approximately reached.

In block 408, the user device 102 updates the load distribution data based on the weight and placement of the package(s) loaded onto the aircraft 106. For example, the user device 102 may recalculate the load distribution data by adding the weight of the package to the zone and subtracting the weight from the remaining cargo to be loaded. The user device 102 may update the management GUI based on the recalculated load distribution data. In some cases, the GUI will remain the same as before the package was loaded, such as in the case when the package was loaded into a recommended zone and the zone remained under the recommended weight. In other cases, the management GUI may be updated to reflect the recalculated load distribution data, such as when a package is placed into a different zone than the recommended zone and/or the package causes a zone weight to exceed a recommended weight/range. In some implementations, the management GUI may inform the user when the desired weight is loaded in the zone. In these implementations, the management GUI may instruct the user to start loading the next zone.

In block 410, the user device 102 determines whether loading is complete. In some implementations, the management GUI may include a GUI element that a user may touch/click to indicate that loading is complete. In some implementations, the user device 102 may determine that loading is complete based on the identity, number, and/or weight of packages loaded. For example, if the user device 102 includes data indicating which packages should be loaded (e.g., barcodes), the number of packages to be loaded, and/or the weight of the packages to be loaded, then the user device 102 may determine when all packages have been loaded. The user device 102 may acquire package data while loading in order to automatically determine when the packages have been loaded. For example, the user device 102 may acquire package ID data (e.g., barcodes), package loading numbers, and/or package weights. Additionally, the user device 102 may have access to data indicating the identities of the packages, the number of packages, and/or the weight of the packages.

If loading is not complete in block 410, the method may continue in block 404. If loading is complete in block 410, in some implementations, the user device 102 may generate a completion interface (e.g., a completion GUI) in block 412. A completion GUI may provide the pilot, or other party, with GUI elements for finalizing the weight and balance of the aircraft. For example, a completion GUI may provide a summary of the weight and balance of the aircraft 106. The completion GUI may also include confirmation GUI elements that allow the pilot to confirm the weight and balance of the aircraft 106. In some implementations, the pilot may generate a digital record (e.g., digital document) and/or printed record of the weight and balance. For example, the pilot may save a digital document on the user device or in a remote management system 100-2. As another example, the pilot may interact with the completion GUI to have the weight and balance data printed out.

Figure 5A:
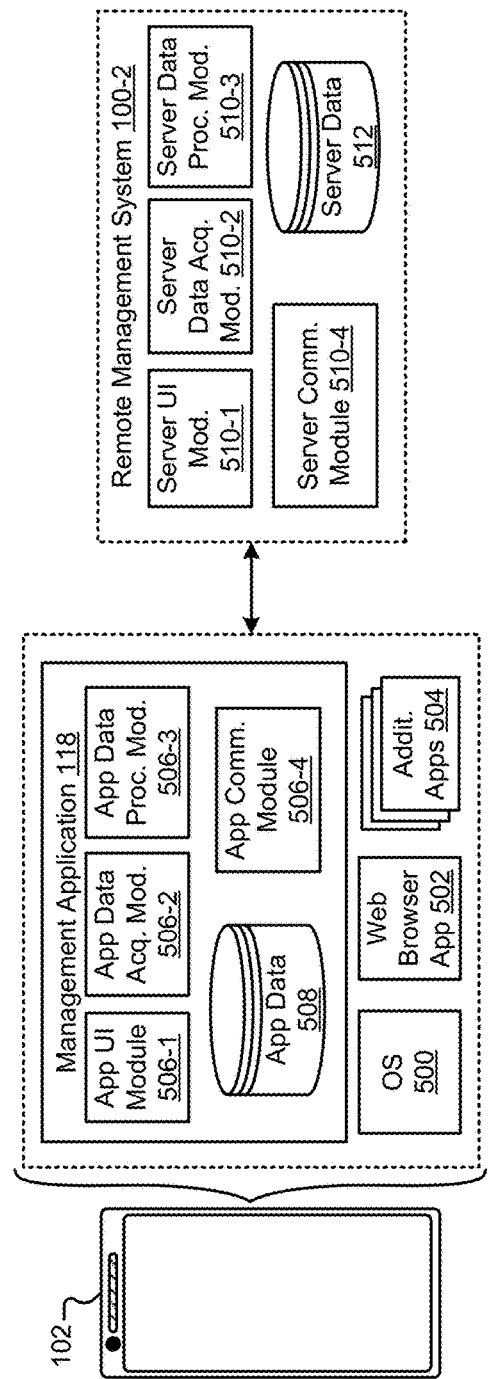
FIG. 5A illustrates an example weight and balance management application.

FIG. 5A illustrates an example management application 118 that may acquire package data, acquire other data (e.g., other weights), calculate load distribution data, and generate GUIs described herein. The user device 102 may also include an operating system (OS) 500, a web browser application 502, and additional installed applications 504.

FIG. 5A illustrates example application modules 506-1, 506-2, 506-3, 506-4 and application data 508 that may provide the functionality associated with the management application 118. The remote management system 100-2 of FIG. 5A also includes a plurality of modules 510-1, 510-2, 510-3, 510-4, and server data 512, which may provide functions that correspond to those attributed to the management application 118. For example, the application 118 and remote system 100-2 may include UI modules 506-1, 510-1 that generate GUIs, data acquisition modules 506-2, 510-2 that acquire data, data processing modules 506-3, 510-3 that process data, communication modules 506-4, 510-4 that provide communication with other devices, and data stores

508, 512 that store data. The application 118 (e.g., modules 506 and data 508) and remote management system modules 510 and data 512 (e.g., stored in memory) may include computer-executable instructions that, when executed by one or more processing units of the computing devices (e.g., mobile/server device), cause the computing devices to perform various functions attributed to the computing devices herein.

Although a single user device executing a single management application 118 may provide the functionality described herein, in some implementations, one or more applications executing on one or more devices may also provide the functionality described herein. In some implementations, the one or more user devices may execute the management application 118 locally. In some implementations, one or more user devices may access application functionality executing on the remote management system 100-2.

Figure 5B:
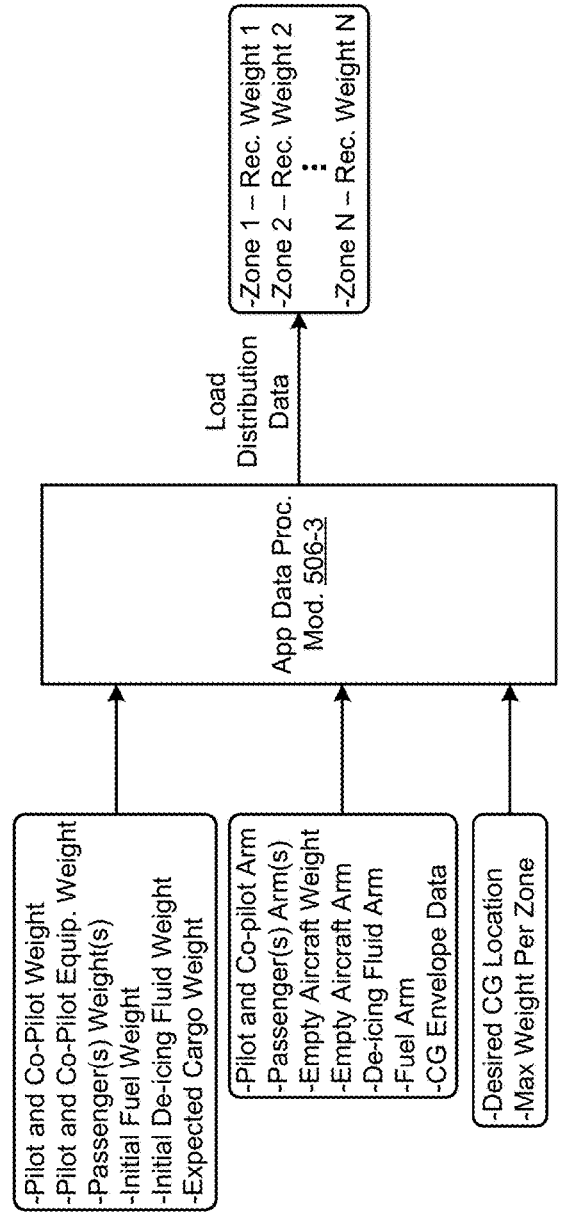
FIG. 5B illustrates example application data used by an example weight and balance management application.

FIG. 5B illustrates example application data used by the application data processing module 506-3 to determine the load distribution data. For example, the application data processing module 506-3 may implement the load distribution calculations/optimizations described herein. Example weight data may include, but is not limited to: 1) pilot weight and co-pilot weight, 2) pilot and co-pilot equipment weight, 3) passenger(s) and passenger baggage weights, 4) initial fuel weight (e.g., takeoff fuel weight), 5) de-icing fluid weight, and 6) expected cargo weight. The management application 118 may also receive aircraft data, which may include, but is not limited to: 1) a pilot arm, 2) a copilot arm, 3) other passenger(s) arm(s), 4) an empty aircraft weight, 5) an empty aircraft arm, 6) a de-icing fluid arm, 7) a fuel arm, and 8) CG envelope data (e.g., see FIG. 3 and FIG. 8). The management application 118 may also include other aircraft data, such as a desired CG location and a maximum weight per zone.

In some implementations, the management application 118 may receive the aircraft data (e.g., arms, CG envelope, desired CG, and max zone weights) as manual input from a user. For example, a user may interact with the management GUI to indicate the aircraft arms, CG envelope, and other data. In some implementations, the management application may download the aircraft data for the specific aircraft (e.g., from the remote system 100-2, a manufacturer site/database, or other site). For example, the remote system 100-2, manufacturer sites/databases, or other sites may include aircraft data records for different aircraft that include data that may be used by the management system 100. The aircraft data records, which may be curated by the management system 100 and/or available from manufacturer/other sites/databases, may include any of the aircraft data described herein. For example, an aircraft data record may include data associated with zones, arms, weights, etc. Example data in an aircraft data record may include, but is not limited to: 1) for each zone: CG location and minimum and maximum weight, 2) aircraft empty weight, 3) fuel moment as a function of fuel quantity, 4) CG envelope (min and max CG location vs aircraft weight), and 5) optimal/preferred CG location. In cases where an aircraft has been modified (e.g., added/modified zones), the associated aircraft data record may be updated to reflect the modifications.

Figure 6:
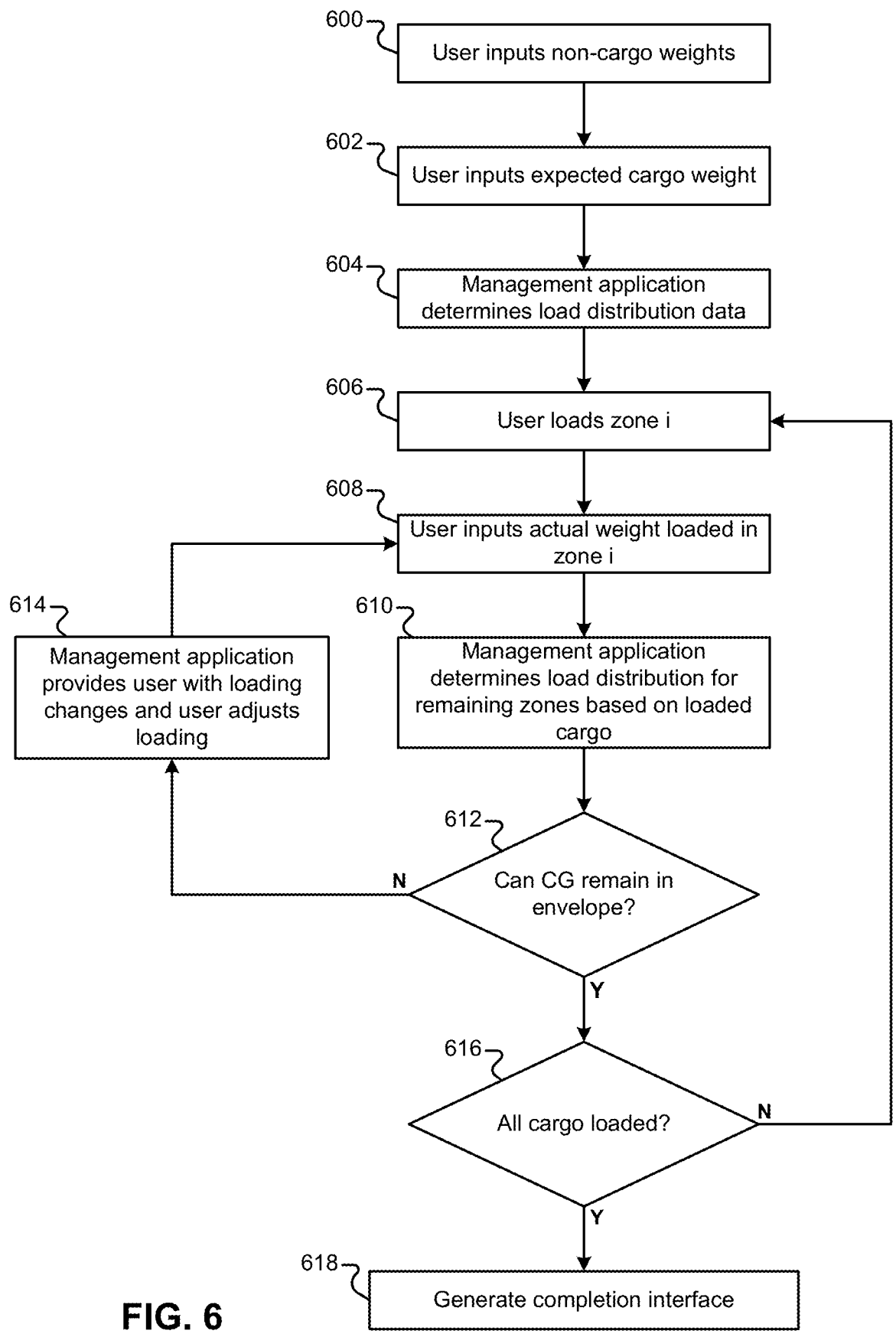
FIG. 6 illustrates another example method describing operation of the weight and balance management system.

FIG. 6 illustrates another example method describing operation of the management system 100. In FIG. 6, the management system 100 provides updates to a user when loading of the aircraft causes a deviation outside of the CG envelope. In block 600, a user inputs the weights for non-cargo items. The arms for the non-cargo items may be stored in memory or may be input/modified by the user. Some items may be locked so that the user may not modify them.

In block 602, the user inputs the total expected cargo weight. The actual cargo weight may differ from the original expected cargo weight in some cases. In block 604, the user device 102 computes a distribution of cargo weights that places the CG at the desired location, accounting for the various constraints. In some implementations, if the CG cannot be placed inside the allowable envelope, an error message is displayed. In some implementations, if the CG cannot be placed at the desired location, the user device will provide a cargo distribution that places the CG as close as possible to the desired location, but within the allowable envelope.

In block 606, the user loads one of the zones (zone i) while attempting to match the suggested loading weight. In block 608, after the zone is loaded, the user inputs the actual loaded weight for the zone. In block 610, the user device 102 recomputes a distribution that optimizes the CG location by adjusting the weights for the remaining zones. In block 612, if the current loading precludes the CG from remaining within the allowable envelope after loading the remaining cargo, the user device 102 indicates to the user that loading must be adjusted in block 614. If the current loading precludes the CG from being at the desired location, the user device 102 may indicate to the user that loading should be adjusted to provide a better CG location. In some implementations, the GUI may inform the user of how much weight should be removed/added to the zone(s) in order to be able to meet the desired/allowable CG. If all cargo is loaded in block 616, the user device 102 may present a completion interface in block 618.

FIGS. 7-8 illustrate example management GUIs. FIG. 7 illustrates an example management GUI that includes recommended zone weights (e.g., optimal weights), actual zone weights (e.g., as loaded weights), zone volumes (e.g., actual loaded volume percentage), acceptable ranges of weights for zones, and other weights. FIG. 8 illustrates an example CG envelope. The example envelopes and weights in FIGS. 7-8 may be used for a Cessna Caravan 208B.

In the example GUI of FIG. 7, all aircraft data including empty weight and arms may be stored in memory. The user may input the weights. The rectangles may indicate items that can be input by the user and/or automatically populated by the management system 100. The column labeled "As Loaded" may receive inputs from the user. The user may load the aircraft 106 using the guidance from the "Optimal" column and then input the actual weight in the "As Loaded" column. When a new value is input in the "As Loaded" column, the user device 102 may recompute the distribution for the remaining cargo.

The column labeled "Volume %" may be used to collect data about the volume occupied by the cargo. Using the occupied volume and the loaded weight for each zone, the management system 100 may learn the typical density of cargo. This may be used to update a heuristic to distribute the cargo. For example, if there are many (e.g., infinite) solutions to load distribution, the heuristic can be used to spread the cargo evenly volumetrically or to ensure that zones further aft are not filled volumetrically more than the one further forward.

The column labeled "Optimal" may provide the optimal cargo distributions. In the first row (labeled "Cargo"), the user may input the estimated cargo to be loaded. The following rows display the result of the load distribution calculations. The values in the column may be either the "as-loaded" value if a zone is loaded, or the suggested loading for zones that are yet loaded. The "estimated cargo" on the first row may be automatically adjusted to reflect the loaded cargo if the loaded cargo differs from the initial estimation.

The column labeled "Acceptable range" indicates the minimum and maximum weights that can be loaded in each zone to ensure that the CG remains within the allowable envelope. For example, the acceptable range may indicate that any weight within that range will provide an acceptable loading configuration. The acceptable range may be updated every time a new zone's weight is entered. The columns labeled "Index and % MAC (mean aerodynamic chord)" allow the application to meet any method of weight and balance calculation, depending upon aircraft type and manufacturer processes. In some implementations, the user may select (e.g., touch/click) the "Calculate" button to cause the management application 118 to update the values. In some implementations, the management application 118 may update the values automatically (e.g., without user prompting) in response to changes in any of the input values.

FIG. 8 illustrates an example CG envelope using units of inches and pounds. The "optimized CG" line 800 indicates where the CG is/will be if the suggested optimal distribution is achieved. The top point of line 800 is the location of the CG at takeoff. The bottom point of line 800 is the CG location when all fuel has been used. An additional point (not illustrated) may be displayed to indicate the landing weight as all the fuel may not be used, or planned to be used, for the trip. Dot 802 indicates the forward-most allowable CG location. Dot 804 indicates the current CG location. It may be the result of the CG location using the pilot, copilot, fuel, and loaded cargo only. As the cargo gets loaded, this point may move toward the optimal CG location. In some implementations, the GUIs of FIGS. 7-8 may include GUI elements for printing the GUIs (e.g., to an electronic format and/or paper format) and/or exporting the data.

The GUIs in FIGS. 7-8 are only example GUIs that may be displayed on user devices, such as mobile devices (e.g., smartphones, tablets, laptops, etc.), desktop devices, and other types of devices. In some implementations, the user devices may render the GUIs as illustrated in FIGS. 7-8. In some implementations, the user devices may be configured to render subsets of the GUIs, such as information that is relevant to a current task. For example, if a user is loading a single zone, the GUI may render data associated with loading the single zone, instead of all zones. After loading the single zone, the GUI may render other relevant information, such as confirmation GUI elements for confirming the single zone weight and/or other updated recommended zone weights/ranges.

Figure 9:
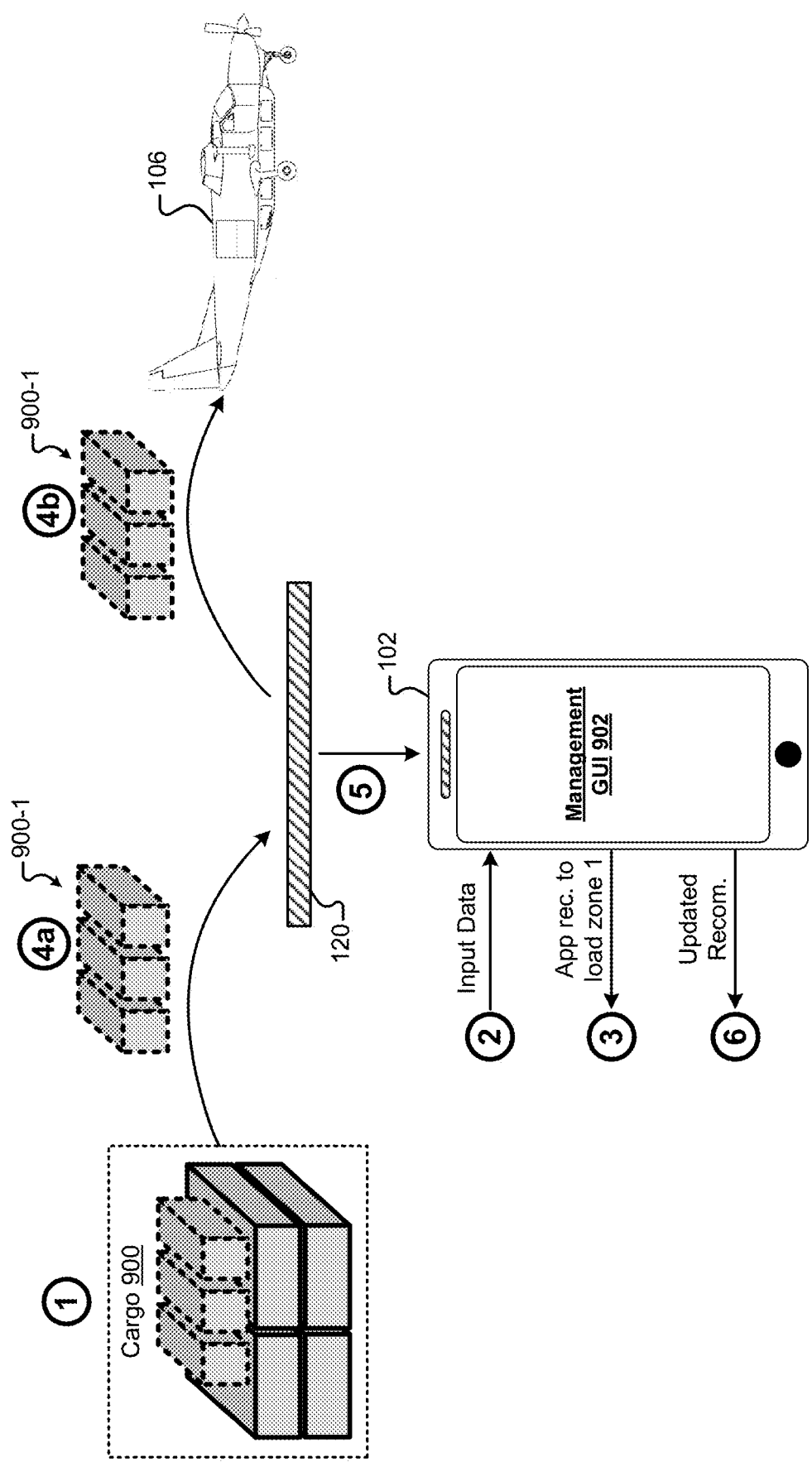
FIG. 9 illustrates the use of an example weight and balance management system while loading cargo onto an aircraft.
Figure 10:
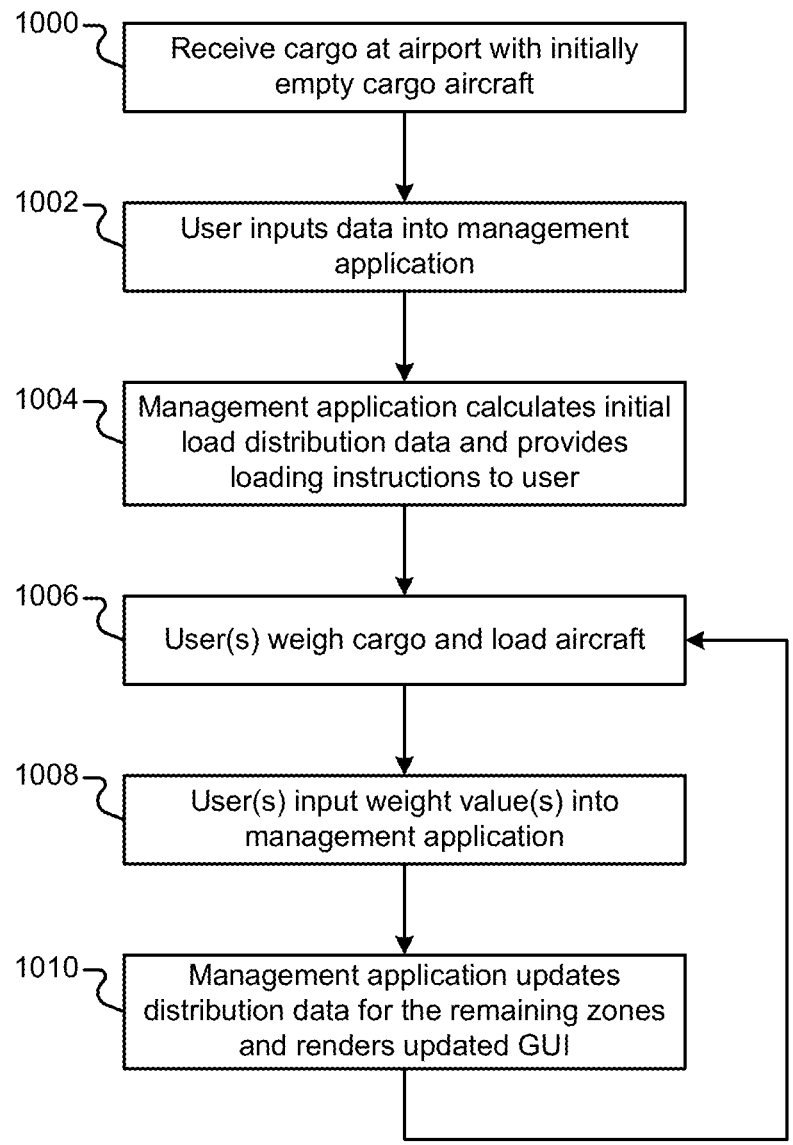
FIG. 10 illustrates a method that describes example operations of a weight and balance management system.

FIGS. 9-10 illustrate operation of an example management system 100. In FIG. 9, the airport receives cargo 900 for loading onto a cargo aircraft 106. For example, the cargo 900 may have been included in a container unloaded from a larger aircraft. An example initial unloaded cargo weight may be approximately 1,500 lbs. In FIG. 9, the cargo area(s) in the cargo aircraft 106 may be initially empty. In FIG. 9, one or more users may use a scale 120 to weigh packages before including the packages into the cargo aircraft 106. The users may use one or more user devices 102 that execute a management application 118 configured to receive data from the users, such as weight values for cargo and other objects included on the aircraft 106. The management application 118 may also render a management GUI 902 that instructs the user(s) how to load the aircraft 106.

FIG. 10 illustrates a method that describes example operations of the management system 100 (e.g., as illustrated in FIG. 9). The management system 100 may include a user device 102 that executes a management application 118. The management system 100 may also include a scale 120 that weighs cargo. In block 1000, cargo is received at the airport and the cargo aircraft is initially empty (e.g., indicated at '1' in FIG. 9). In block 1002, the user inputs data into the management application 118 (e.g., indicated at '2' in FIG. 9). Example data may include, but is not limited to, fuel for the route, his/her weight, flight kit weight, total estimated cargo weight to be loaded, and/or any other data described herein.

In block 1004, the management application 118 calculates initial load distribution data and provides loading instructions to the user (e.g., recommendations to load zone one at '3' in FIG. 9). For example, the management application 118 may recommend that a first zone be loaded with an optimal weight and/or a weight within a range of weights. In block 1006, the user(s) weigh cargo and place the cargo on the aircraft (e.g., indicated at '4a' and '4b' in FIG. 9). FIG. 9 illustrates an example portion of the cargo 900-1 being weighed on a scale 120 and loaded onto the aircraft 106. In some implementations, the user(s) may weigh each item of cargo (e.g., package, container, etc.) as they are loaded onto the aircraft. The scale may keep a tally of the total weight being loaded for the zone.

In block 1008, a user may input a weight value into the management application 118 for the weight loaded into the zone (e.g., indicated at '5' in FIG. 9). In some implementations, the user may read a scale that has tallied the weight and then input the weight value into the management application 118. In some implementations, the scale 120 may be connected to the user device 102 (e.g., using a wired/wireless connection). In these implementations, the scale 120 may send the weight value to the device 102, which may be confirmed by the user. The user may reset the scale 120 to zero after the zone is loaded and the weight value is input.

In block 1010, the management application 118 updates distribution data for the remaining zones and renders an updated GUI that indicates weight distributions for the remaining zones (e.g., indicated at '6' in FIG. 9). If the current loading does not permit for a CG at the desired location or at an allowable location, the GUI may prompt the user with a warning and request a modification to the loading. The user(s) may then continue weighing and loading cargo according to the suggested weight distributions for the remaining zones. As described herein, the user(s) loading the aircraft may choose the order of zones they load and the packages they load into the zones, which may provide flexibility when loading an aircraft with packages having different weights and dimensions.

Although the management system 100 is described herein with respect to loading aircraft or other vehicles in a longitudinal direction (e.g., along a longitudinal axis), in some implementations, the management system 100 may perform calculations associated with weight and balance of lateral zones for an aircraft or other vehicle (e.g., zones defined along a lateral axis). For example, lateral zones may refer to zones that are next to one another along a lateral axis (e.g., having the same associated arm length in some cases). In some implementations, the management system 100 may determine the weight associated with lateral zones and the balance associated with the lateral zones. In some implementations, the management system 100 may ensure that the difference in weight between the lateral zones (e.g., two sides of the aircraft) is within acceptable limits (e.g., as set by the aircraft manufacturer). The management application 118 may provide loading instructions for lateral zones in a manner similar to the longitudinal zones described herein. In implementations where the weight difference between lateral zones is outside of acceptable limits, the management application 118 may notify the user that some weight may require alternate placement in the aircraft (e.g., a shift from one zone to another zone).

As described herein, in some implementations, the management system 100 may make load distribution calculations on a per-zone basis. The sizes of zones may vary by aircraft. The sizes of zones may also be modified by the owner of the aircraft. In some implementations, the aircraft may be modified to include additional zones (e.g., shorter zones) that allow for more granular determination of weight and balance. In some implementations, the management system 100 may determine more accurate locations of individual cargo (e.g., a package or package container). In these implementations, the management system 100 may perform weight and balance calculations on a per-package or per-container basis based on specific arm lengths associated with specific packages/containers. For example, in some implementations, the management system 100 may estimate a more accurate location of a package within a zone (e.g., forward or back in the zone). In a specific example, the management system 100 may divide an existing zone into fractions, such as a front/back half of a zone. In this specific example, the management system 100 may use different arm lengths based on whether the package was placed in a forward/back portion of the zone. The number of fractions into which a zone may be split may depend on the size of the zone and a dimensional resolution that is measurable by devices and/or convenient for users to report.

In some implementations, the specific locations of packages/containers in the cargo area may be reported by users. For example, a user may enter the specific locations into the management application 118. In some implementations, the location of packages/containers in the cargo area may be determined using a computing device. For example, a computing device, such as a camera or other computer vision and image processing device, may automatically determine a location (e.g., an arm length) of a package/container in the cargo area (e.g., using processed images). Other example computing devices that may be used by the management system 100 to determine a location of a package/container in the cargo area may include, but are not limited to, a 3D scanner, LIDAR, ultrasound sensors, radio-frequency identification (RFID) devices, or other devices. In some cases, the location may be relative to an existing zone marker or other marker that indicates a location (e.g., an arm length) in the cargo area. For example, a camera, or other distance measurement device, may determine the arm associated with a specific package based on the observed distance between the specific package and a marking (e.g., a zone marking or other marking) that indicates a specific location (e.g., arm length) in the cargo area. In some implementations, the management system 100 may be configured to perform weight and balance calculations described herein based on the locations of individual packages/containers (e.g., specific locations for all packages/containers). In some implementations, the management system 100 may be configured to perform weight and balance calculations described herein using a mix of locations for weights/packages, such as when some packages are associated with a predefined zone and some other packages are associated with package-specific arms.

As described herein, the management system 100 may be implemented across a plurality of devices while loading cargo. In some implementations, the interface (e.g., management GUI 902) may be mirrored across a plurality of devices so that multiple users may be informed of the cargo loading operations. In other cases, different user devices may implement different aspects of the management system 100. For example, a user that weighs packages may have a weight GUI that can be used for acquiring weights from a scale. A weight GUI may indicate the weight of the package on the scale, indicate weight in a current zone being loaded, and allow the user to zero out the scale. In this example, another user may use a loading GUI that provides recommendations for loading a package and provides the user with GUI elements for selecting zones, adding packages to zones, removing packages form the zones/aircraft, and moving packages between zones. Various aspects of the different GUIs described herein may be implemented and rendered by one or more management applications.

As described herein, package data acquired by a local device or provided by a remote device may include package dimensions/volume. In implementations where package dimensions/volume are available, the management system 100 may determine load distribution data based on the package dimensions/volume. For example, the load distribution data may place constraints on the total dimensions/volume of packages that may fit into specific zones. As also described herein, package data may indicate whether the package may be hazardous, perishable, and/or temperature restricted (e.g., must remain under a temperature). In these implementations, the management system 100 may constrain the placement of the packages to specific zones that may be appropriate for hazardous materials, perishable materials, and/or temperature restricted materials.

As described herein, users may use one or more computing devices (e.g., user devices) when loading the aircraft. The one or more computing devices of the management system 100 may execute one or more weight and balance management applications 118. In some implementations, the management system 100 may include remote computing devices (e.g., remote servers). The computing devices may include electronic hardware and software that implements the functionalities attributed to the computing devices herein. For example, the computing devices may include one or more processing units (i.e., processors), such as central processing units (CPUs) and/or graphics processing units (GPUs). The computing devices may include memory (e.g., main memory, such as random-access memory), one or more storage devices, and network devices. The components of the computing devices may be interconnected by buses or other communication circuitry.

The processing unit(s) of a computing device can execute computer-executable instructions in the memory. For example, the processing unit(s) can execute the management application, an operating system, a web browser application, and additional applications, all of which can be implemented as computer-executable instructions. The memory and storage device can include one or more computer-readable mediums (e.g., random-access memory, hard disk drives, solid state memory drives, flash memory drives, etc.) that can store any suitable data that is utilized by the operating system and/or any of the applications that are executed by the computing devices. In some implementations, a storage device may include non-volatile memory. The network devices may be configured to perform wired and/or wireless communication with a network.

The modules and data stores described herein may be embodied by electronic hardware, software, firmware, or any combination thereof. Depiction of different features as separate modules and data stores does not necessarily imply whether the modules and data stores are embodied by common or separate electronic hardware or software components. In some implementations, the features associated with the one or more modules and data stores depicted herein may be realized by common electronic hardware and software components. In some implementations, the features associated with the one or more modules and data stores depicted herein may be realized by separate electronic hardware and software components.

The management system 100 may include one or more computing devices that are configured to implement the techniques described herein. Each of the one or more computing devices may include any combination of electronic hardware, software, and/or firmware described above. For example, each of the one or more computing devices may include any combination of processing units, memory components, and storage devices. The one or more computing devices of the management system 100 may also include various human interface devices, including, but not limited to, display screens, keyboards, pointing devices (e.g., a mouse), touchscreens, speakers, and microphones.

In some examples, the management system 100 may include one or more server computing devices configured to communicate with user devices. The one or more computing devices may reside within a single machine at a single geographic location in some examples. In other examples, the one or more computing devices may reside within multiple machines at a single geographic location. In still other examples, the one or more computing devices of the management system 100 may be distributed across a number of geographic locations.

What is claimed is:

1. A non-transitory computer-readable medium comprising computer-executable instructions, the computer-executable instructions configured to cause one or more processing units to:
   determine an initial total weight of an aircraft loaded with loaded items;
   determine initial load distribution data for an aircraft cargo area in the aircraft based on an estimated initial total weight of unloaded items and on the initial total cargo weight, wherein the aircraft cargo area includes a plurality of zones, and wherein the initial load distribution data includes a recommended weight for each of the zones and an estimated center of gravity (CG) for the aircraft as loaded with the unloaded and loaded items;
   display the initial load distribution data on a user device;
   acquire a first weight value for a first set of one or more items of the unloaded items;
   determine that the first set of one or more items has been loaded into a first zone and that a remaining set of one or more items has not yet been loaded;
   determine updated load distribution data based on the first weight value and the location of the first zone in the aircraft, wherein the updated load distribution data includes an updated recommended weight for each of the zones and an updated CG for the aircraft based on the first set and remaining set of one or more items, wherein redistribution load data comprises the updated recommended weight for each of the zones and the updated CG for the aircraft; and
   display the updated load distribution data on the user device.

2. The computer-readable medium of claim 1, further comprising instructions that cause the one or more processing units to acquire the first weight value on the user device via user input.

3. The computer-readable medium of claim 1, further comprising instructions that cause the one or more processing units to acquire the first weight value from a scale in communication with the user device.

4. The computer-readable medium of claim 1, further comprising instructions that cause the one or more processing units to acquire the first weight value by optically scanning the first set of one or more items.

5. The computer-readable medium of claim 1, further comprising instructions that cause the one or more processing units to acquire the first weight value from a remote server that includes one or more weight values for the first set of one or more items.

6. The computer-readable medium of claim 1, further comprising instructions that cause the one or more processing units to determine that the first set of one or more items has been loaded into the first zone based on user input on the user device.

7. The computer-readable medium of claim 1, further comprising instructions that cause the one or more processing units to automatically determine that the first set of one or more items has been loaded into the first zone using an image acquisition device.

8. The computer-readable medium of claim 1, further comprising instructions that cause the one or more processing units to:
   determine when the first zone is loaded; and
   instruct the user to load a second zone of the plurality of zones when the first zone is loaded.

9. The computer-readable medium of claim 1, further comprising instructions that cause the one or more processing units to instruct the user to load the second zone after the first zone based on a sequence of zones indicated in a predetermined loading sequence for the aircraft.

10. The computer-readable medium of claim 1, further comprising instructions that cause the one or more processing units to receive user indication that the user is loading a second set of one or more items into a second zone after the first zone is loaded.

11. The computer-readable medium of claim 1, further comprising instructions that cause the one or more processing units to determine the updated load distribution data based on one or more CG location constraints.

12. The computer-readable medium of claim 11, further comprising instructions that cause the one or more processing units to render a notification on the user device that indicates when the one or more CG location constraints are not achievable based on a current loading of the aircraft.

13. The computer-readable medium of claim 1, further comprising instructions that cause the one or more processing units to determine the updated load distribution data by minimizing the deviation of the CG from a desired CG for the aircraft.

14. The computer-readable medium of claim 1, further comprising instructions that cause the one or more processing units to determine the updated load distribution data based on one or more zone weight constraints.

15. The computer-readable medium of claim 1, further comprising instructions that cause the one or more processing units to render a cargo management graphical user interface that receives user input indicating an amount of weight has been moved from the first zone to a second zone.

16. The computer-readable medium of claim 1, further comprising instructions that cause the one or more processing units to:
acquire an additional weight value for an additional item in the first zone;
determine a specific location of the additional item within the first zone; and
determine the updated load distribution data based on the additional weight value and the specific location of the additional item in the first zone.

17. The computer-readable medium of claim 1, further comprising instructions that cause the one or more processing units to:
determine a plurality of subsequent weight values for subsequent sets of items loaded onto the aircraft;
determine subsequent updated load distribution data for each of the subsequent sets of items; and
display the subsequent updated load distribution data on the user device as the subsequent updated load distribution data is calculated.

18. A method comprising:
determining an initial total weight of an aircraft loaded with loaded items;
determining, on a user device, initial load distribution data for the aircraft cargo area in an aircraft based on an estimated initial total weight of unloaded items and on the initial total cargo weight, wherein the aircraft cargo area includes a plurality of zones, and wherein the initial load distribution data includes a recommended weight for each of the zones and an estimated center of gravity (CG) for the aircraft as loaded with the unloaded and loaded items;
displaying the initial load distribution data on the user device;
acquiring, on the user device, a first weight value for a first set of one or more items of the unloaded items;
determining, on the user device, that the first set of one or more items has been loaded into a first zone and that a remaining set of one or more items has not yet been loaded;
determining, on the user device, updated load distribution data based on the first weight value and the location of the first zone in the aircraft, wherein the updated load distribution data includes an updated recommended weight for each of the zones and an updated CG for the aircraft based on the first set and remaining set of one or more items, wherein redistribution load data comprises the updated recommended weight for each of the zones and the updated CG for the aircraft; and
displaying the updated load distribution data on the user device.

19. The method of claim 18, further comprising acquiring the first weight value on the user device via user input.

20. The method of claim 18, further comprising acquiring the first weight value from a scale in communication with the user device.

21. The method of claim 18, further comprising acquiring the first weight value by optically scanning the first set of one or more items.

22. The method of claim 18, further comprising acquiring the first weight value from a remote server that includes one or more weight values for the first set of one or more items.

23. The method of claim 18, further comprising determining that the first set of one or more items has been loaded into the first zone based on user input on the user device.

24. The method of claim 18, further comprising automatically determining that the first set of one or more items has been loaded into the first zone using an image acquisition device.

25. The method of claim 18, further comprising:
determining when the first zone is loaded; and
instructing the user to load a second zone of the plurality of zones when the first zone is loaded.

26. The method of claim 18, further comprising instructing the user to load the second zone after the first zone based on a sequence of zones indicated in a predetermined loading sequence for the aircraft.

27. The method of claim 18, further comprising receiving user indication that the user is loading a second set of one or more items into a second zone after the first zone is loaded.

28. The method of claim 18, further comprising determining the updated load distribution data based on one or more CG location constraints.

29. The method of claim 28, further comprising rendering a notification on the user device that indicates when the one or more CG location constraints are not achievable based on a current loading of the aircraft.

30. The method of claim 18, further comprising determining the updated load distribution data by minimizing the deviation of the CG from a desired CG for the aircraft.

31. The method of claim 18, further comprising determining the updated load distribution data based on one or more zone weight constraints.

32. The method of claim 18, further comprising rendering a cargo management graphical user interface that receives user input indicating an amount of weight has been moved from the first zone to a second zone.

33. The method of claim 18, further comprising:
acquiring an additional weight value for an additional item in the first zone;
determining a specific location of the additional item within the first zone; and
determining the updated load distribution data based on the additional weight value and the specific location of the additional item in the first zone.

34. The method of claim 18, further comprising:
determining a plurality of subsequent weight values for subsequent sets of items loaded onto the aircraft;
determining subsequent updated load distribution data for each of the subsequent sets of items; and
displaying the subsequent updated load distribution data on the user device as the subsequent updated load distribution data is calculated.

* * * * *